United States Patent Office 3,271,301
Patented Sept. 6, 1966

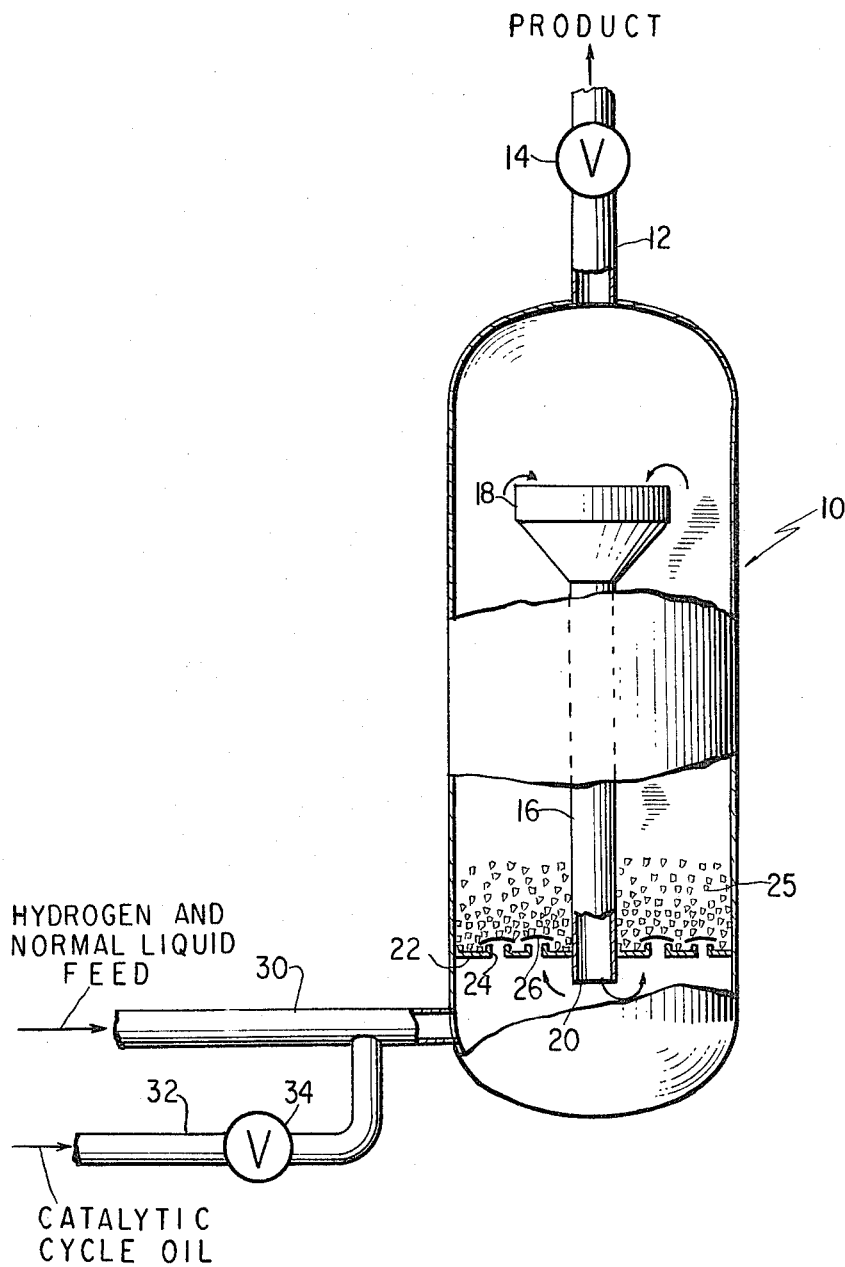

3,271,301
HYDROGENATION PROCESS
Richmond B. Galbreath, Fanwood, N.J., assignor to Cities Service Research and Development Company, New York, N.Y., a corporation of New Jersey
Filed Feb. 3, 1964, Ser. No. 341,941
4 Claims. (Cl. 208—143)

This invention relates to the regeneration of hydrogenation catalyst and more particularly to regeneration of such catalyst employed for hydrogenating heavy hydrocarbon oils.

When hydrogenating or hydrocracking residual oils the catalyst in contact with the oil tends to accumulate deposits which reduce its capacity to effect hydrogenation. Normally this requires a shutdown and a chargeout of catalyst or a burn off of the deposits to restore hydrogenation capacity.

It is a primary object of this invention to provide a method for reactivating a hydrogenation catalyst while the reactor is maintained on stream and without transporting the catalyst to a different vessel for regeneration.

It is another object of this invention to provide a method for reactivating hydrogenation catalyst in situ while hydrogenating a hydrocarbon oil. Additional objects of the invention will become evident in the following description of the invention.

Briefly, in this invention a residual oil feed stream is hydrogenated in a reaction zone in contact with an expanded catalyst mass and hydrogen under hydrogenation conditions of temperature and pressure. After the activity of the catalyst has decreased due to normal usage, e.g. when the amount of hydrogen consumed per barrel of feed has decreased, there is substituted for the residual oil feed a catalytic cycle oil feed stream, together with hydrogen, which is also processed in the reaction zone under hydrogenating conditions of temperature and pressure for a time sufficient to reactivate the catalyst for hydrogenation of residual oil. Residual oil is then substituted as feedstock in place of the catalytic cycle oil. Reactivation of the catalyst can be determined by the increased hydrogen consumption in the reaction with residual oil. Thus it has been found that by substituting the catalytic cycle oil feed for the residual oil and hydrogenating a sufficient quantity of the cycle oil in the reactor, the activity of the catalyst is regenerated for the hydrogenation of residual oil. The reaction temperature in hydrogenating the catalytic cycle oil is preferably lower than that for hydrogenating the residual oil in order to insure that a substantial portion of the cycle oil is hydrogenated in the liquid phase. However, all other conditions in the reaction zone can be the same as in the hydrogenation of the residual oil.

The process of this invention is preferably operated continuously. The quantity of catalytic cycle oil feed for reactivating the catalyst can vary over a wide range. It is only necessary that a sufficient quantity of the cycle oil be passed through the catalyst mass to remove deposits in the mass in order to increase the hydrogenation activity of the catalyst. The quantity of cycle oil required will vary over a wide range and will also be dependent on the composition of the cycle oil, the type of residual oil hydrogenated before the introduction of cycle oil, the quantity of catalyst, etc. Generally, however, it is sufficient that the quantity of catalytic cycle feed be from about ⅓ to ¹⁄₁₀₀ of the quantity of residual oil fed to the reactor having a fresh or regenerated catalyst.

In operating the process of this invention, the catalyst mass is preferably in the form of an expanded or ebullated bed. Use of an ebullated or expanded bed is described in U.S. Patent 2,987,456 which issued to E. J. Johanson on June 6, 1961. In the expanded or ebullated bed technique liquid or a mixture of liquid and gases in a reaction zone pass upwardly through a mass of catalyst particles at a sufficient velocity to expand the volume of the catalyst mass and cause random movement of catalyst particles but at an insufficient velocity to cause general upward movement or carry over the catalyst from the bed. The expansion of the catalyst mass in such instances is normally between about 10% to about 300% based on the unexpanded volume of the catalyst mass.

In general, the catalytic cycle stocks employed in this invention for reactivating the catalyst have API gravities from about 12° to 32°, sulfur contents in the order of 1.25 to 0.10 weight percent, contain about 2% to about 10% of olefins by volume and having about 30% to 55% by volume of aromatics. Preferably the aromatic content is from about 35% to about 50% by volume of the catalytic cycle oil feed.

Catalyst employed in this invention may be any suitable hydrogenation catalyst such as cobalt, iron, molybdenum, nickel, tungsten or cobalt molybdate. Such catalysts as well as sulfides and oxides may be used alone or together with other suitable catalyst or in combination with each other and all such catalyst may, of course, be supported on suitable bases, such as aluminum, silica, or aluminia-silica gel. Such catalyst is present in the form of finely divided particles having a suitable size such as at least about ¹⁄₃₂ of an inch with particle size in the order of ¹⁄₁₆ of an inch to ¼ of an inch being more usual. The term hydrogenation catalyst as employed herein refers to any such catalyst irrespective of additional functions such as cracking of hydrocarbons.

The quantity of catalyst in the reactor is preferably sufficient to provide one pound of catalyst for a rate of from 0.1 to 2 barrels of oil feed per operating day.

Space velocity in the reactor may vary widely such as between about 0.2 and about 5.0 volumes of feed per hour per volume of reactor capacity. Hydrogen is introduced into the reactor in quantities suitable to the particular hydrogenation reaction taking place in the reactor and may, for instance, be introduced at rates between about 2,500 and 10,000 standard cubic feet (s.c.f.) per barrel of feed. Likewise, the temperature at which the reactor is maintained will vary widely depending upon the particular reaction taking place as well as upon the feed and other variables with temperatures between about 775° F. and 850° F. being preferably used in hydrogenating the residual oil and lower temperatures, such as from about 700° F. to about 750° F. being employed in hydrogenating the catalytic cycle oil. This lower temperature is used in hydrogenating the cycle oil so that an appreciable portion of the cycle oil will be in the liquid phase. The reactor may be maintained under any suitable pressure such as between about 1,000 and 4,000 p.s.i.g. partial pressure of hydrogen.

Conventional techniques can be employed to maintain a substantially even temperature throughout the reaction zone such as hydrogen quenching or the use of a draft tube to effect recycle of the liquids in the reactor.

Regeneration of the catalyst as described herein can be repeated at intervals as found necessary although there is a limitation as to the number of times the catalyst can be regenerated in accordance with the process of this invention.

The following example and the drawing will further illustrate the invention. A vacuum residuum oil having the following properties is used as feed: gravity of about 8 API; sulfur of about 2.5 weight percent, with less than 5% of the oil boiling below 975° F. This feed is introduced through feed line 30 together with 3,500 standard cubic feet of hydrogen per barrel of feed into reactor 10. The hydrogen is introduced in the form of a hydrogen containing recycle gas stream containing 80 volume percent hydrogen. The oil is introduced into the reactor at a rate of 2,500 barrels per day. The reactor is maintained at a hydrogen partial pressure of about 1,500 p.s.i.g., temperature of 810° F. The mixture of residual oil and hydrogen passes upwardly through the openings between caps 26 and risers 24 in grid 22. The feed expands the hydrogenation catalyst mass 25. The space velocity in the reactor is maintained at about 0.95 volume of liquid feed per hour per volume of reactor space. Hydrogenation is effected in the reactor with the consumption of about 1050 standard cubic feet of hydrogen per barrel of feed. A mixture of oil, hydrogen and hydrogenated products passes upwardly in reactor 10 where a portion of this mixture is removed through product outlet line 12 and valve 14. A portion of the liquid in reactor 10 recirculates within the reactor by passing downwardly through funnel 18 of draft tube 16 and is discharged through opening 20 into the bottom of reactor 10. A liquid recycle ratio of about 15 times the liquid feed rate is provided. After continuous operation for 28 days under the above conditions it is found that the hydrogenation activity of the catalyst has steadily decreased and only 700 standard cubic feet of hydrogen are consumed per barrel of feed. The residual oil feed to the reactor is discontinued and catalytic cycle oil through line 32 and valve 34 are fed into the reactor and hydrogenated, in place of the residual oil, together with hydrogen. The rate of feed of the catalytic cycle oil is maintained at 2,500 barrels per day; the hydrogen partial pressure is about 1,500 p.s.i.g.; the space velocity is maintained at about 0.95 volume of liquid feed per hour per volume of reactor space and all other conditions are maintained the same in the reactor as in the hydrogenation of the residual oil except that the temperature is maintained at 730° F. After continuous operation for 36 hours with the catalytic cycle oil feed, residual oil is again substituted as feedstock and run under the hereinbefore described conditions in the hydrogenation of the residual oil and it is found that the hydrogen consumption has risen to about 1,000 standard cubic feet of hydrogen per barrel of oil.

Illustrative of suitable residual oil feeds there can be mentioned: atmospheric tower bottoms; vacuum tower bottoms; deasphalted gas oils derived from crude petroleum; natural tar; bitumen from tar sands; and the like. The residual oil can have a boiling range from about 350° F. to about 1150° F. with more than about 50% boiling in excess of 650° F. and preferably wherein at least 20% by volume, boils in excess of about 1,000° F. Products which can be recovered from the process of this invention include normally gaseous products boiling between about 650° F., light fuel oil products boiling between about 400° F. and 650° F., naphtha fractions boiling between 65° F. and 400° F. and a heavy gas oil fraction boiling between about 850° F and 1,000° F.

What is claimed is:

1. A continuous process for hydrogenating hydrocarbon oil which comprises maintaining a reaction zone containing a mass of particulate hydrogenation catalyst under hydrogen pressure and elevated temperature, alternately feeding residual oil at least 50 volume per cent of which boils above 650° F. and catalytic cycle oil having between about 30 and about 50 volume percent aromatics into said reaction zone upwardly in the liquid phase through the catalyst mass and expanding the volume of the mass by about 10% to about 300% as compared to its settled volume and hydrogenating said oils, and wherein the quantity of cycle oil fed to the reactor is between about one-third and one one-hundredth the quantity of residual oil fed to the reactor.

2. A hydrogenation process which comprises feeding a stream of residual oil at least 50 volume percent of which boils above 650° F. and hydrogen into a reactor maintained under hydrogenation conditions of temperature and pressure, contacting said hydrogen and residual oil feed with a hydrogenation catalyst maintained in random motion and hydrogenating said oil while simultaneously diminishing hydrogenation activity of the catalyst due to normal use, substituting a catalytic cycle oil having between about 30 and about 50 volume percent aromatics as feed in place of the residual oil and feeding a stream of cycle oil into the reactor maintained under hydrogenation conditions of temperature and pressure, contacting the cycle oil and hydrogen with the catalyst of diminished activity and hydrogenating a quantity of cycle oil sufficient to increase hydrogenation activity of the catalyst for residual oil and again substituting residual oil as feedstock in said reactor.

3. The process of claim 2 wherein at least a portion of the residual oil feed and cycle oil feed is hydrogenated in the liquid phase.

4. A process for maintaining a hydrogenation reactor on stream while regenerating hydrogenation catalyst in situ which comprises feeding residual oil at least 50 volume percent of which boils above 650° F. and hydrogen into a reactor maintained under hydrogenation conditions of temperature and pressure, passing the residual oil feed and hydrogen upwardly in the reactor in contact with a hydrogenation catalyst mass and hydrogenating the oil at least partially in the liquid phase, said mass being expanded by about 10% to about 300% as compared to its settled volume by the passage therethrough of the upwardly flowing feed, substituting catalytic cycle oil having between about 30 and about 50 volume percent aromatics for the residual oil as feedstock after the hydrogenation activity of the catalyst has been diminished, feeding said cycle oil and hydrogen into the reactor maintained under hydrogenation conditions of temperature and pressure, and hydrogenating the cycle oil at least partially in the liquid phase by passage through the expanded catalyst mass for a period of time sufficient to increase the hydrogenation activity of the catalyst for residual oil and then again substituting residual oil as the feedstock to the reactor while maintaining the reactor on stream.

References Cited by the Examiner

UNITED STATES PATENTS

| | | | |
|---|---|---|---|
| 2,723,946 | 11/1955 | Donaldson | 208—79 |
| 3,011,971 | 12/1961 | Slyngstad et al. | 208—216 |
| 3,124,518 | 3/1964 | Guzman et al. | 208—143 |
| 3,158,563 | 11/1964 | Strecker | 208—111 |

DELBERT E. GANTZ, *Primary Examiner.*

S. P. JONES, *Assistant Examiner.*